Patented Jan. 20, 1953

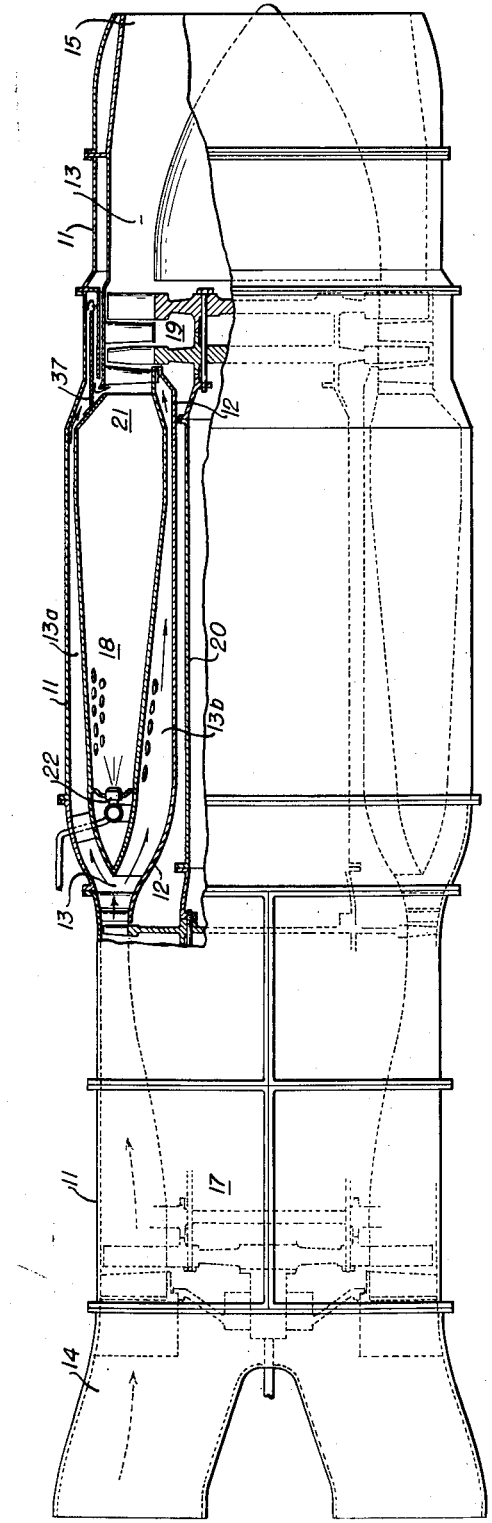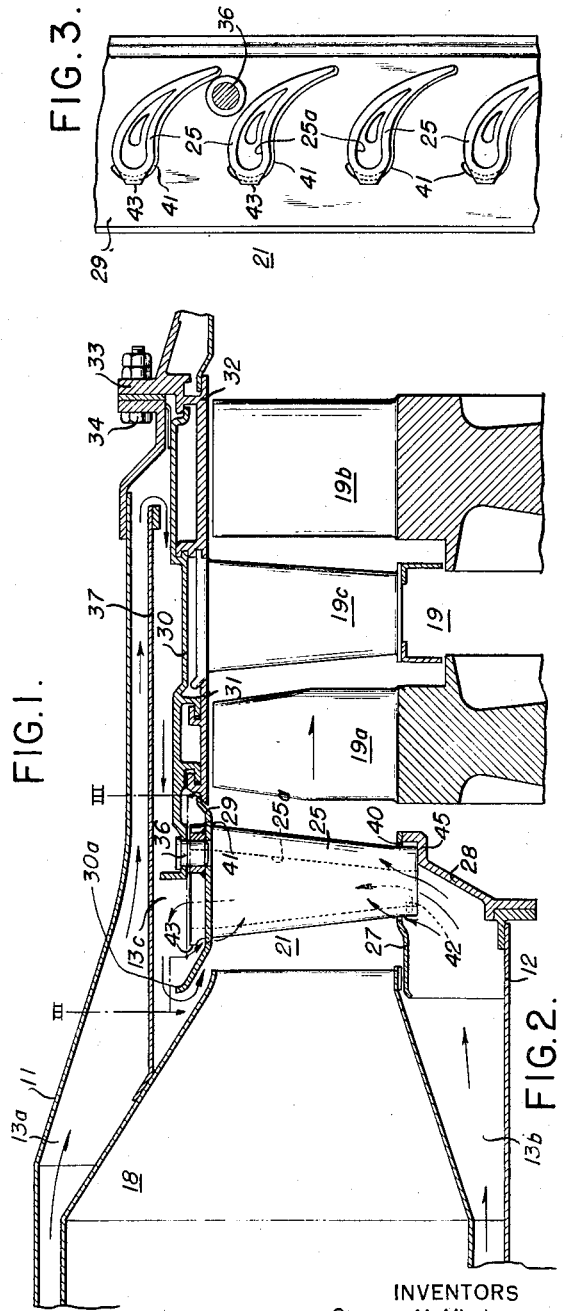

2,625,793

UNITED STATES PATENT OFFICE 2,625,793

GAS TURBINE APPARATUS WITH AIR-COOLING MEANS

George M. Mierley, Havertown, and John N. Schlotter, Philadelphia, Pa., assignors to Westinghouse Electric Corporation, East Pittsburgh, Pa., a corporation of Pennsylvania Application May 19, 1949, Serial No. 94,202

1 Claim. (Cl. 60—39.65)

This invention relates to gas turbine power plants, and more particularly to a turbine nozzle and related structure for a gas turbine.

In the development of gas turbine apparatus, such as aircraft turbo-jet engines, it has been proposed to provide means for effecting circulation of a cooling medium about the turbine nozzle structure which is usually interposed between the combustion apparatus and the turbine. It is an object of the present invention to provide an improved nozzle assembly of this type, having a lightweight and sturdy construction, and including hollow vane elements associated with air-flow means adapted to induce constant circulation of cooling air through and over the outer surfaces of the vane elements.

Another object of the invention is to provide nozzle structure including hollow vane elements loosely mounted in annular shrouds to permit expansion and to facilitate circulation of air, the opposite ends of each vane being locked to ensure retention in the event of accidental failure of the vane.

It is another object of the invention to provide an improved turbine nozzle assembly comprising air-cooled vane elements adapted to be carried by relatively thin annular shrouds for minimizing weight and bulk.

These and other objects are effected by the invention as will be apparent from the following description and claim taken in connection with the accompanying drawing, forming a part of this application, in which:

Fig. 1 is a diagrammatic view, partly sectional, of a typical gas turbine engine having an improved nozzle structure embodying the invention;

Fig. 2 is a fragmentary view, in enlarged detail, of a portion of the apparatus shown in Fig. 1; and Fig. 3 is a fragmentary sectional view taken substantially along the line III—III of Fig. 2.

Referring now to the drawing in greater detail, the typical gas turbine engine illustrated diagrammatically in Fig. 1 comprises an outer substantially cylindrical casing structure 11 having mounted therein a sectional core structure 12 forming an annular passage, generally indicated at 13, which extends longitudinally through the engine from a frontal air intake duct 14 to a rearwardly-disposed discharge nozzle 15. The operating elements of the engine are disposed in axial alignment within the casing structure and include an axial-flow compressor 17, annular combustion apparatus 18, and a two-stage turbine 19, the rotor of which is connected to the rotor of the compressor through the medium of a tubular shaft 20, the rotor assembly being journaled in suitable bearings mounted in the core structure 12. An annular nozzle assembly 21 is disposed in advance of the turbine 12.

The general principles of operation of such a power plant are well known and may briefly be summarized as follows: air entering the intake duct 14 is compressed by the compressor 17, from which it is delivered to the combustion apparatus 18 for supporting combustion of fuel supplied thereto by way of atomizing nozzles 22. Excess or secondary air under pressure is, at the same time, supplied from the compressor through outer and inner annular branch passages 13a and 13b formed on opposite sides of the combustion apparatus 18, for preventing undesirable local concentrations of temperature. Hot motive fluid issuing from the combustion apparatus 18 is expanded through the turbine 19 and is finally discharged to the atmosphere by way of the nozzle 15, usually in the form of a jet establishing propulsive thrust.

In Fig. 2, the nozzle assembly 21 and associated parts of the apparatus are shown in greater detail as comprising a plurality of stationary hollow vane elements 25 radially arranged between an inner shroud ring 27 carried on an annular bracket element 28 of the core structure 12, and an outer shroud ring 29 secured to a forwardly-projecting annular wall section 30 of the outer casing structure 11. It will be noted that the turbine 19 consists of two stages of rotary blading 19a and 19b disposed on opposite sides of an intermediate stage of stationary vanes 19c, the latter being carried by a suitable shroud assembly supported on casing sections 31 and 32 having interlocking engagement with the wall section 30. A flange 33 formed on the casing section 32 is secured into the outer casing structure 11 by bolts 34. The turbine 19 and a portion of the nozzle assembly 21 are overhung by the wall section 30, the forward free end of which is secured to the outer shroud ring 29 by a plurality of spaced pins 36, and terminates in an outwardly-extending annular flange 30a.

A rearwardly-extending annular baffle 37, the upstream end of which is welded or otherwise secured to the outer wall of the combustion apparatus 18, is disposed in spaced relation between the outer casing structure 11 and the wall 30, and is adapted to guide air flowing through the outer annular passage 13a through a tortuous path, as indicated by the arrows in Fig. 2. A restricted passage 13c of reduced flow area is thus provided in the passage 13a, adjacent the flange 30a of the wall 30, for promoting entrainment of air issuing from the hollow vanes 25, as hereinafter more fully explained.

According to the invention, each of the vanes 25 is tapered and suitably warped to provide an airfoil cross-section best adapted for the purpose to be served. The inner and outer shroud rings 27 and 29 may be made of relatively thin metal stock to minimize weight, and may be economically punched "cold" to form suitably contoured apertures or slots 40 and 41, respectively, for loosely receiving the vanes 25. As shown in Fig. 2, the small or inner end of each vane is provided with a weld or boss portion 42 for preventing dislodgement from the shroud ring 27, while a lug 43 is, for the same reason, formed on the outer end of each vane for engagement with the outer surface of the shroud ring 29. The inner end of each vane 25 is adapted to engage a shoulder 45 formed on the annular bracket element 28, while an outer surface is engageable with the adjacent forward end of the wall 30.

As already pointed out, each vane is hollow, having a passage 25a forming communication between the passages 13b and 13a. The slots 40 and 41 are made sufficiently oversize, with relation to the engaging portions of the respective vanes 25, to provide spaces at the upstream sides thereof (see Fig. 3) through which cooling air from the passages 13a and 13b can flow over the surfaces exposed to the hot combustion gases or motive fluid supplied to the turbine, as indicated by arrows in Fig. 2.

In operation, while hot motive fluid issues from the combustion apparatus 18 and flows past the assembled vanes 25 to the turbine 19, cooler air flows through the inner and outer passages 13b and 13a, and, in part, passes through exposed portions of the slots 40 and 41 to mix with the motive fluid enveloping the vanes. Air in the outer passage 13a is turned at the rear end of the baffle 37 and is thence conducted forwardly, cooling the wall 30 and associated shroud elements, before passing through the narrow passage 13c to effect entrainment of the air which meanwhile issues from the passages 25a of the vanes 25. In passing through these passages in the vanes, air from the inner passage 13b thus serves to effect further cooling of the vanes, before being finally discharged, along with air from passage 13a, around the free end of the shroud ring 29 into the main stream of motive fluid.

From the foregoing, it will now be seen that with the improved nozzle construction contributed by the invention, hollow air-cooled vanes may be safely mounted in shroud rings of lightweight design, and may be effectively protected from excessive heat by circulation of air over both interior and exterior surfaces. By reason of the interlocked engagement of both ends of each vane element in the outer and inner shroud rings, possible failure of any vane, due to such developments as poor temperature distribution or a "hot band" in the stream of motive fluid, will effectively be prevented from causing any part of a vane to become dislodged and swept into the turbine.

While we have shown our invention in but one form, it will be obvious to those skilled in the art that it is not so limited, but is susceptible of various changes and modifications without departing from the spirit thereof.

What we claim is:

In a gas turbine power plant, a cylindrical casing, combustion structure including an annular outer wall coaxially spaced inwardly of said casing, an annular turbine shroud assembly supported interiorly of said casing at a point downstream of said combustion structure and extending coaxially upstream into spaced alignment with said outer wall thereof to define a turbine inlet passage, said outer wall of the combustion structure and said shroud assembly being spaced inwardly of said casing to form an outer annular cooling air passage which encompasses said shroud assembly and communicates with said turbine inlet passage only through the space between the upstream end of said shroud assembly and said outer wall of the combustion structure, and a tubular baffle secured to said outer wall of the combustion structure and coaxially spaced in telescoping relation between said casing and said shroud assembly, said baffle being adapted to guide cooling air to the downstream end of said outer annular passage where the direction of flow is reversed and the air conducted in cooling contact with said shroud assembly prior to introduction into said turbine inlet passage for modifying the temperature of turbine inlet gases.

GEORGE M. MIERLEY.
JOHN N. SCHLOTTER.

REFERENCES CITED

The following references are of record in the file of this patent:

UNITED STATES PATENTS

| Number | Name | Date |
| --- | --- | --- |
| 2,432,359 | Streid | Dec. 9, 1947 |
| 2,445,661 | Constant | July 20, 1948 |
| 2,479,777 | Price | Aug. 23, 1949 |
| 2,488,783 | Stalker | Nov. 22, 1949 |
| 2,489,683 | Stalker | Nov. 29, 1949 |

FOREIGN PATENTS

| Number | Country | Date |
| --- | --- | --- |
| 687,108 | Germany | Jan. 23, 1940 |
| 696,062 | Germany | Sept. 10, 1940 |